June 13, 1944.  J. SIVERTSEN  2,351,574
RECORDER FOR TESTING MACHINES
Filed Feb. 9, 1943  3 Sheets-Sheet 1

INVENTOR
Jens Sivertsen
BY
Herbert P. Fairbanks
ATTORNEY

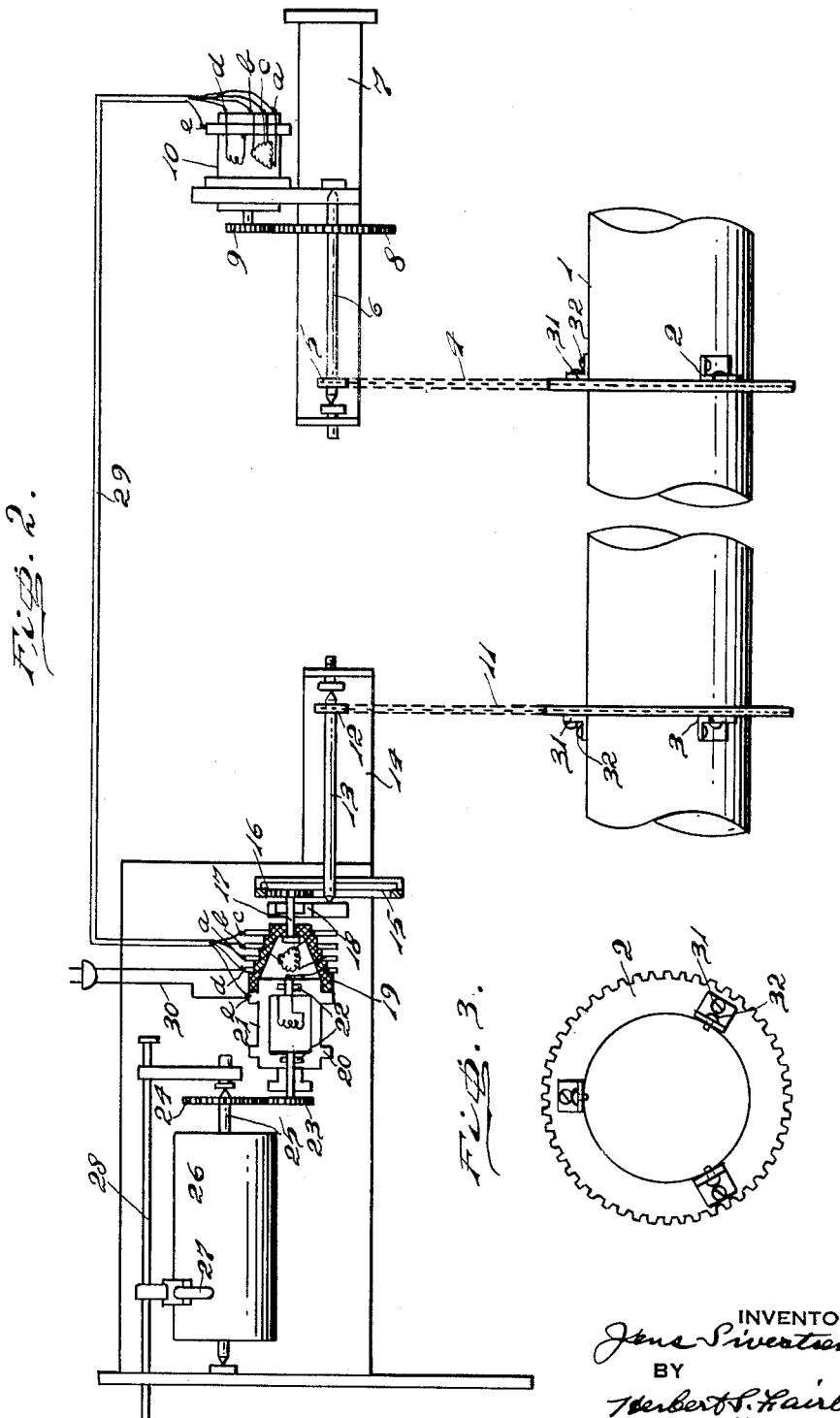

June 13, 1944.  J. SIVERTSEN  2,351,574
RECORDER FOR TESTING MACHINES
Filed Feb. 9, 1943  3 Sheets-Sheet 3
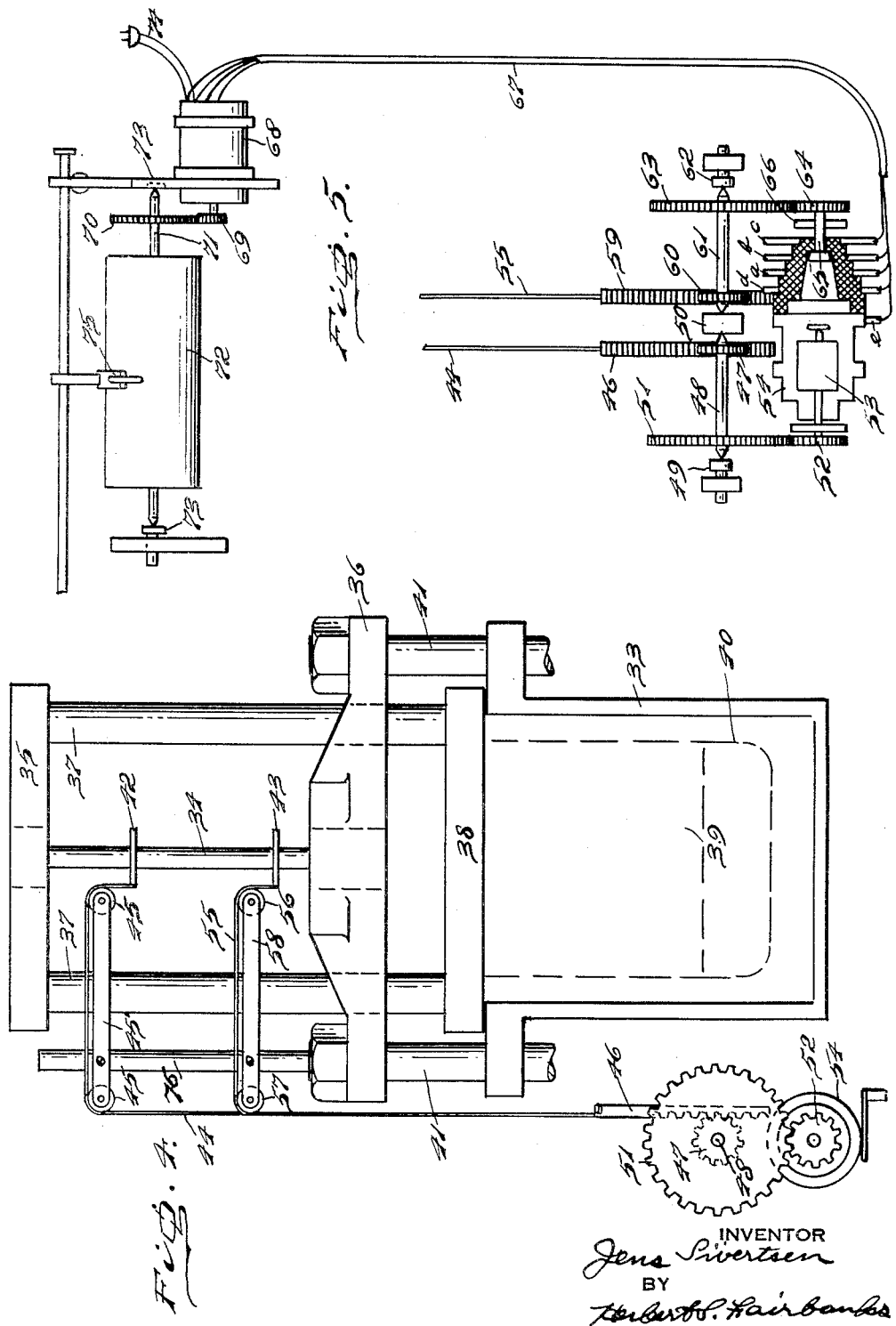
INVENTOR
Jens Sivertsen
BY
Herbert P. Fairbanks
ATTORNEY Patented June 13, 1944

2,351,574

UNITED STATES PATENT OFFICE

2,351,574

RECORDER FOR TESTING MACHINES

Jens Sivertsen, Philadelphia, Pa., assignor to Tinius Olsen Testing Machine Company, Philadelphia, Pa., a corporation of Pennsylvania Application February 9, 1943, Serial No. 475,307

8 Claims. (Cl. 265—2)

The object of this invention is to devise a novel recorder which is adapted to be used with torsional types of testing machines and with tensile types of testing machines.

The purpose of the recorder is to plot a curve indicative of load measured in foot lbs. versus the distortion which has taken place between two selected planes of a specimen under test.

In a torsion test, the sections of the specimen in the selected planes will change their angular positions. We are not interested in the absolute distortion which has taken place in these two planes, but in the sum of the minute distortions which have taken place in the preselected distance of the specimen, in other words the difference between the distortions in the two planes.

Heretofore, this has been accomplished by a differential gear arrangement, which has certain disadvantages due to friction in the gears, shafts, bearings and the like, and since instrument work of a very high order was required, the manufacturing costs were high.

In order to overcome the foregoing disadvantages, I have devised a novel electro-mechanical means by the use of which the accuracy is increased, and the manufacturing costs materially lowered.

With the foregoing and other objects in view which will hereinafter clearly appear, my invention comprehends a novel recorder for testing machines.

It further comprehends a novel electro-mechanical control system utilizing self-synchronous motors of the "Selsyn" type.

Other novel features of construction and advantage will hereinafter appear in the detailed description and the appended claims.

For the purpose of illustrating the invention, I have shown in the accompanying drawings preferred embodiments of it which I have found in practice to give satisfactory and reliable results. It is, however, to be understood that the various instrumentalities of which the invention consists can be variously arranged and organized and the invention is not limited to the exact arrangement and organization of these instrumentalities as herein shown.

Figure 2 is a side elevation, showing more clearly the construction and arrangement of the mechanism for controlling the recording drum.

Figure 3 is a side elevation of a sprocket adapted to be fixed to a selected plane of the specimen under test.

Figure 4 is a front elevation of a portion of a tensile type of testing machine in conjunction with a portion of the mechanism for controlling the revolution of the recording drum.

Figure 5 is a schematic view showing more in detail the mechanism for controlling the revolution of the recording drum.

Similar numerals of reference indicate corresponding parts.

Figure 1:
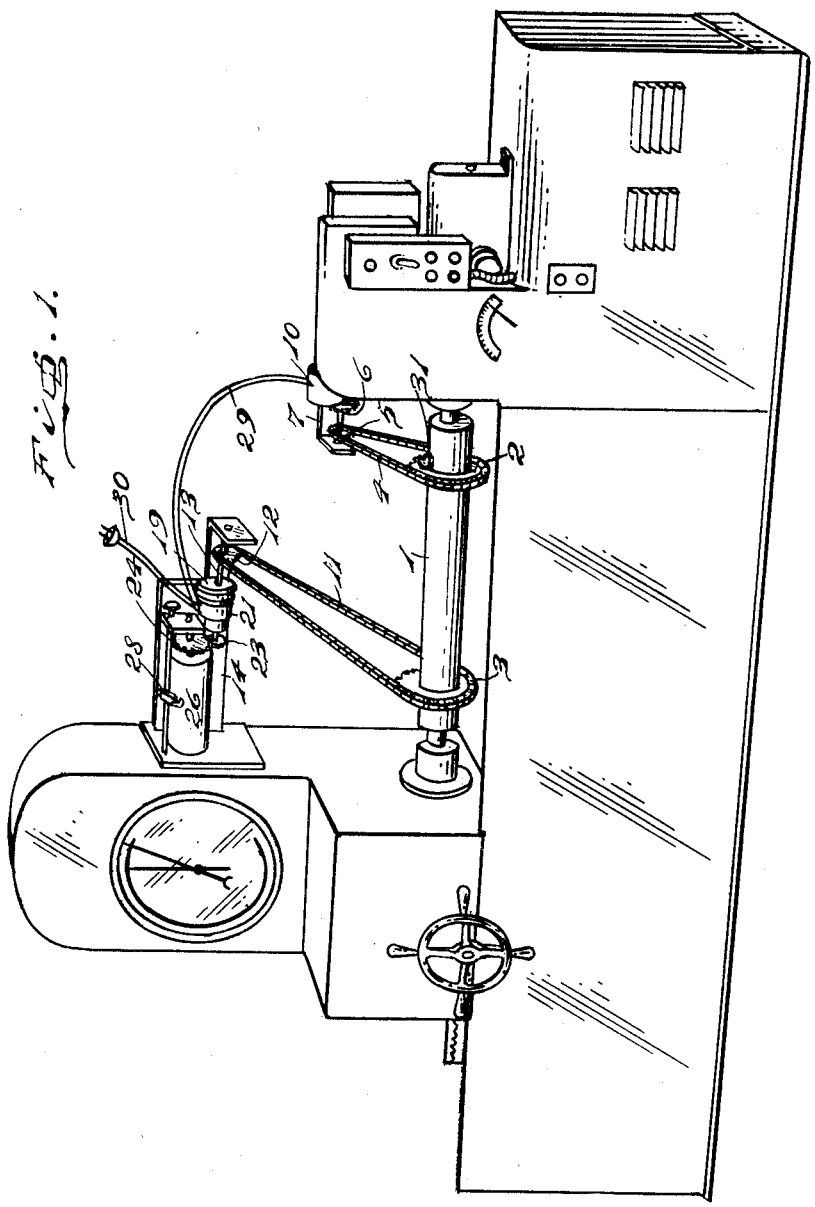
Figure 1 is a perspective view of a torsional type of testing machine in conjunction with which my novel recorder is illustrated.

Referring to the drawings:

In Figures 1, 2, and 3, I have shown my invention as applied to a standard torsional type of testing machine.

Referring now to these figures, 1 designates a specimen to be tested, and sprockets 2 and 3 are fixed to the specimen in any desired manner in two selected planes. The sprocket 2 is at the driving end of the machine and has a sprocket chain 4, which passes around a sprocket 5, on a shaft 6, journalled in a bracket 7, fixed to the frame of the machine. The shaft 6 has a gear 8 meshing with a gear 9, fixed to the shaft of the armature or rotor of a self-synchronous motor 10, such as for example a "Selsyn" or Autosyn motor.

The sprocket 3 has a sprocket chain 11, which passes around a sprocket 12, on a shaft 13 journalled in antifriction bearings on a shaft 14, carried by the machine frame. The shaft 13 carries an internal gear 15 which meshes with a gear 16 on a shaft 17, journalled at 18, and fixed to an insulator 19, which is rigidly connected with the stator 20 of a "Selsyn" motor 21. The stator 20 is mounted in ball bearings 22 and is free to rotate. The shaft of the rotor of the motor 21 has a gear 23 which meshes with a gear 24 on a shaft 25, suitably journalled and carrying a recording drum 26. A marker 27 cooperates with the recording drum and is adjustable on a longitudinally movable rod 28, which moves in accordance with the load applied to the specimen in the manner well known in the art.

The insulators 19 of the two motors 10 and 21 have rings $a$, $b$, $c$, and $d$, and the circular frame forms a fifth ring $e$. A cable 29 connects like terminals in the two motors. A cable 30 for the motor 21 is connected with a source of electric supply. The conventional hookup between two "Selsyn" motors is well known as well as the operation of a "Selsyn" motor.

The construction and operation of self-synchronous motors is set forth in a Circular 2—41

(SM), filing Number 8490 of the General Electric Company of Schenectady, N. Y.

It will now be apparent that if the sprockets 2 and 3 are fixed in their adjusted positions to the specimen, the distortion of the specimen will be communicated to the sprockets to turn them. The sprockets have brackets 31, provided with fastening devices 32 to engage the specimen.

If the sprocket 3, chain 11 and parts driven from such sprocket and chain are standing still, and the sprocket 2, chain 4, gear 5, shaft 6, and gears 8 and 9 are driven, due to a torsional strain on the specimen, the rotor of the self-synchronous motor 10 will be driven, thereby causing the rotation of the rotor of the self-synchronous motor 21. Since the rotor of the motor 21 is intergeared with the shaft of the recording drum 26, such drum will rotate an angle which is proportioned to the rotation of the sprocket 2.

If both sprockets 2 and 3 rotate an equal amount in the same direction, the armature or rotor of the motor 10 and the stator of motor 21 will rotate, but the rotor of motor 21 will stand still and therefore also the recording drum.

If both sprockets rotate in different amounts, the drum will rotate, and an angle proportional to the difference between the two movements of the sprockets will be indicated on the recording drum.

In Figures 4 and 5, I have shown another embodiment of my invention, utilizing the same general principle but applied to a tensile type of testing machine instead of a torsional type as in Figures 1 and 2.

In the form of the invention I employ self-synchronous motors such as "Selsyn" motors, but have found it to be more practical to have one motor determine the difference between the two movements at different planes of the specimen, and to use the second motor to rotate the drum an amount equal to such difference.

In Figure 5, 33 designates a tensile testing machine of any desired or conventional type, in which a specimen to be tested 34 is secured in the conventional manner by wedge grips or other holding means to an upper crosshead 35 and a lower crosshead 36. The crosshead 35 is carried by uprights 37 rising from a table 38, rigidly connected to a piston 39 of the hydraulic cylinder 40. The specimen is stressed in the conventional manner, the hydraulic fluid introduced into the hydraulic cylinder moving upwardly the table 38, the uprights 37 and the upper crosshead 35. The crosshead 36 is retained in a stationary position by fastening means 41, secured to the base of the machine. Clamps 42 and 43 are fixed to the specimen in two spaced horizontal planes in any desired or conventional manner. A band of spring metal 44 is connected with the clamp 42 and passes over pulleys 45 on a bracket 45', adjustably fixed to the rod 76, fixed to the machine frame. The lower end of the band 44 is connected with a rack 46 which meshes with a pinion 47, fixed to a shaft 48, mounted in bearings 49 and 50. The shaft 48 has a gear 51 fixed to it and meshing with a gear 52 on the shaft of the rotor 53 of a self-synchronous motor 54.

A band of spring metal 55 has one end connected with the clamp 43, passes over pulleys 56 and 57 on a bracket 58 adjustably fixed on the rod 76. The lower end of the band 55 is fixed to a rack 59, meshing with a pinion 60, on a shaft 61, journalled in the bearing 50 and a bearing 62. The shaft 61 has a gear 63 meshing with a gear 64 on a shaft 65 mounted in a bearing 66, and fixed to an insulating collar 67 fixed to the stator of the motor 54. A cable 67 leads from the motor 54 to a second self-synchronous or "Selsyn" motor 68 connecting corresponding parts in the two motors. The motor 68 has its rotor or armature shaft provided with a gear 69 which meshes with a gear 70 on the shaft 71 of a recording drum 72 mounted in bearings 73.

This arrangement causes the drum to be rotated proportional to the increase in length between the clamps 42 and 43, i. e. in accordance with the change in length of the specimen 34 under test. The cable 74 is connected with a source of electric supply. The marker 75 is moved in the conventional manner in accordance with the load applied to the specimen.

It is to be noted that in both embodiments of the invention as herein shown the stator of one of the self-synchronous motors is provided with slip rings electrically connected with the other motor, thereby providing for the revolution of the stator of one of the self-synchronous motors. The motor whose rotor is free to drive the recording drum is the receiver, and the other motor is the transmitter.

Having thus described my invention, what I claim as new and desire to secure by Letters Patent is:

1. In a recorder, a recording drum, and a self-synchronous system controlled by the difference in distortion between two planes of a specimen and controlling said recording drum, said system having two self-synchronous motors, one of which acts as a receiver and drives the recording drum, and the other of which acts as a transmitter to control the rotor of the receiver one of said motors having its stator and rotor free to revolve, and the other of said motors having its stator stationary and its rotor free to revolve and means to mechanically connect a stator and a rotor to two different planes of a specimen to cause them to revolve proportionally to distortion in said planes.

2. In a recorder, a recording drum, a self-synchronous motor having its rotor driving said drum, means to connect its stator with a specimen so that it is mechanically revolved proportionally to distortion in one plane of a specimen under test, a second self-synchronous motor electrically connected with said first motor; means to mechanically connect the rotor of said second motor with a specimen so that it is revolved proportionally to distortion in a second plane of the specimen, and a marker cooperating with said recording drum and moved in accordance with the load applied to the specimen.

3. In a recorder, recording means having a recording drum, a self-synchronous motor having its rotor operatively connected with said drum to revolve it, means fixed to a specimen in one plane thereof and mechanically connected with the stator of said motor to revolve it proportionally to distortion in said plane, a second self-synchronous motor electrically connected with said first motor, and means fixed to the specimen in a second plane thereof and mechanically connected to the rotor of the second motor to revolve it proportionally to distortion in said second plane of the specimen.

4. In a recorder, recording means having a recording drum, and a self-synchronous system controlling said drum, said system having two self-synchronous motors having like parts electrically connected, one motor acting as a receiver and the other motor as a transmitter, with the rotor of the receiver operatively connected with the recording drum to revolve it, means to mechanically connect the rotor and stator of the motor acting as a transmitter with a specimen under test at two different planes thereof to determine the difference in distortion between two planes of the specimen, whereby the rotor of the receiver and the recording drum will revolve proportionally to the difference in distortion in two planes of the specimen.

5. In a recorder for testing machines, a recording drum, two self-synchronous motors having like parts electrically connected, one of said motors acting as a transmitter and the other as a receiver with the receiver rotor connected to the recording drum to drive it, and means to mechanically connect the rotor of the transmitter and the stator of the receiver with a specimen to cause said motors to control the drive of the recording drum proportionally to the difference in distortion between two different planes of a specimen under test, one of said motors having slip rings on and insulated from its stator and forming part of the electrical connection between the motors to thereby permit revolution of such stator during the cycle of the recording operation.

6. In a system to measure the difference in distortion between two planes of a material, two self-synchronous motors, each having a rotor and a stator, one of said stators being prevented from rotation and the other stator and the rotors being free to rotate and forming three elements; means to mechanically drive two of said elements by the movement taking place in said two planes, and one of said rotors rotating an amount proportional to the difference between the two movements.

7. In a recorder for testing machines, a self-synchronous motor system having two self-synchronous motors each motor having a stator and a rotor totalling four elements, one of said elements being prevented from rotation and the other three elements being free to rotate; means to connect one of said elements with a specimen so that it is controlled by the distortion in one plane of a specimen under test; means to connect another rotatable element with the specimen so that it is controlled by distortion in a second plane of the specimen, causing the fourth element to rotate proportionally to the difference between the two distortions.

8. In a recorder, a recording drum, a self-synchronous motor system having a self-synchronous motor with its stator and rotor free to rotate, means to mechanically connect said stator and rotor with two planes of a specimen under test to determine the difference between two movements at the different planes, and a second self-synchronous motor controlled by said first motor and with its stator rigidly fixed and its rotor free to rotate equal to the difference in rotation between the transmitter stator and rotor thereby rotating the recording drum an angle proportional to the difference in distortion in said two planes of the specimen.

JENS SIVERTSEN.